United States Patent [19]

Kasper

[11] 4,232,547
[45] Nov. 11, 1980

[54] FORCE MEASURING DEVICE FOR A CHUCK OR COLLET

[75] Inventor: Daniel K. Kasper, Richfield, Ohio

[73] Assignee: The Warner & Swasey Company, Cleveland, Ohio

[21] Appl. No.: 19,051

[22] Filed: Mar. 9, 1979

[51] Int. Cl.³ .............................................. G01L 1/22
[52] U.S. Cl. ..................................... 73/141 A; 338/5
[58] Field of Search ............ 73/133 R, 141 R, 141 A, 73/141 AB; 338/2, 5, 47

[56] References Cited

U.S. PATENT DOCUMENTS

| | | |
|---|---|---|
| 2,439,146 | 4/1948 | Ruge . |
| 2,472,047 | 5/1949 | Ruge .................................. 73/141 A |
| 2,984,102 | 5/1961 | Soderholm ....................... 73/141 A |
| 3,001,291 | 9/1961 | Sjostrom . |
| 3,461,715 | 8/1969 | Stover . |
| 3,519,146 | 7/1970 | Lunzer . |
| 3,900,812 | 8/1975 | Brewer .......................... 73/141 A X |

FOREIGN PATENT DOCUMENTS 436250 10/1974 U.S.S.R. ............................... 73/133 R

Primary Examiner—Charles A. Ruehl

[57] ABSTRACT

A force measuring device for simultaneously measuring the static or dynamic force from each jaw of a chuck or segment of a collet. The device is formed with an annular housing having several radially extending openings in which are disposed elongated force transducers. In use, the force transducers are supported at the inner end and project from the housing into engagement with the jaws of a chuck. Each transducer has bridge configured strain gages disposed thereon. The strain gages are connected to appropriate instrumentation through a slip ring arrangement. The unbalance of the bridge circuits is used to indicate the force of the chuck.

10 Claims, 7 Drawing Figures

FORCE MEASURING DEVICE FOR A CHUCK OR COLLET

BACKGROUND OF THE INVENTION

1. Field of the Invention

This invention relates to a force measuring device and more particularly to a chuck or collet jaw force measuring device which independently measures the force exerted by each jaw or segment of a chuck or collet.

2. Description of the Prior Art

Chuck jaw or collet segment force measurement is not a widely accepted practice. The most commonly used devices utilize hydraulic force or electrical transducers to measure individual jaw or segment force. The total force exerted by the jaws or segments is then determined by multiplying the individual output by the number of jaws or segments used to grip the piece part.

SUMMARY OF THE INVENTION

The disclosed invention teaches an electrical jaw force measuring device which independently measures the force exerted by each jaw or segment of a chuck or collet. The force measuring device comprises a housing having radially extending bores formed therein. In the case of a three-jaw chuck the bores are spaced 120 degrees apart. Disposed within each bore is an elongated cylindrical force transducer. The inner ends of each force transducer engage a flat portion on a shaft in the center of the housing. The outer ends of the transducers extend from the housing and are engaged by the chuck jaws or collet segments. A hardened spherical steel ball is bonded into a conical seat formed in the outer end of each transducer providing point contact between the transducer and the chuck jaw or collet segment.

Each force transducer consists of a cylindrical member having a square cross section portion formed intermediate its ends. Four flat surfaces are thus provided in the cylindrical member around its longitudinal axis. A four arm strain gage bridge is mounted on each cylindrical member for measuring force. Two gages of the bridge are mounted on one flat surface and the other two gages are mounted on an opposite flat surface of the cylindrical member. The gages are disposed so that temperature compensation will be obtained and the bending and shear components will be eliminated, and only radial gripping forces measured.

The three identical transducers are disposed in the openings formed in the housing. The housing may be formed in two halves which are bolted together. The housing can then be easily disassembled to replace a transducer. The electrical connections to each transducer are through a slip ring assembly to allow for both static and dynamic force measurement.

During operation the transducers are clamped in a chuck or collet. For dynamic measurement the gripping forces can be measured as the holding device rotates. The source of energy and the detector for use with the bridge circuit are mounted away from the chuck jaws or collet segments. The electrical connections to the transducers engaged by the chuck jaws or collet segments are made through slip rings to provide for dynamic measurements.

It is an object of this invention to teach a gage which can provide a static or dynamic measurement of force exerted by each jaw of a chuck or each segment of a collet.

BRIEF DESCRIPTION OF THE DRAWINGS

For a better understanding of the invention reference may be had to the preferred embodiment exemplary thereof shown in the accompanying drawings wherein.

DESCRIPTION OF THE PREFERRED EMBODIMENT

Figure 1:
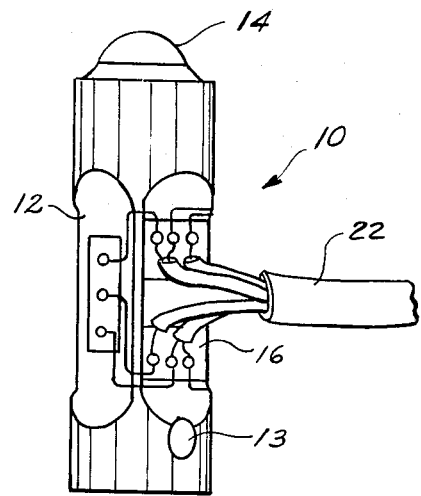
FIG. 1 shows a transducer usable with the force measuring device of the present invention.
Figure 2:
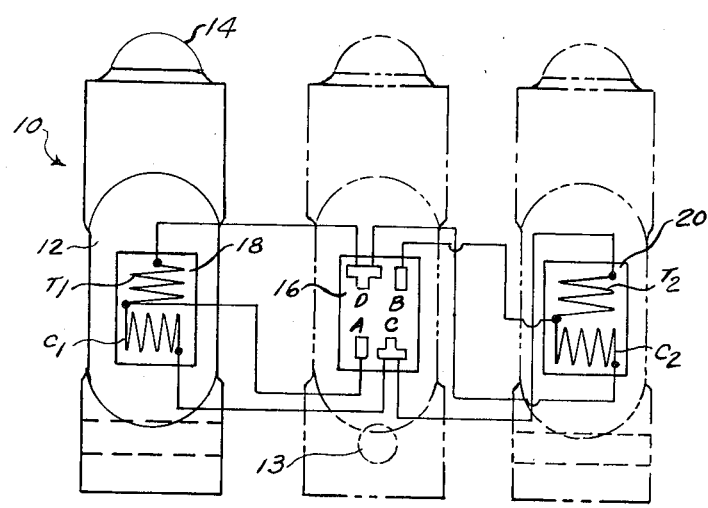
FIG. 2 shows the strain gage locations and interconnections for the transducer shown in FIG. 1.

Referring now to FIGS. 1 and 2, there is shown a force transducer 10 according to the present invention. Force transducer 10 which is generally cylindrical has a square cross-section portion 12 formed intermediate its ends. A hardened spherical ball 14 is bonded into a conical seat machined in the outer end of force transducer 10. Force transducer 10 utilizes a four-arm strain gage bridge with strain gages $C_1$, $C_2$, $T_1$, $T_2$ mounted on two opposite sides of the square portion with an electrical connector block 16 mounted on one of the flat surfaces therebetween. A first pair of strain gages 18, comprising gages $C_1$, $T_1$, are mounted on one flat surface and a second pair of strain gages 20, comprising gages $C_2$, $T_2$, are mounted on the opposite surface. These pairs of strain gages 18 and 20 are bridge connected through connector block 16. Appropriate electrical connections are made to connector block 16 through cable 22. Cable 22 provides the power and metering connections for the bridge connected circuit 21.

Figure 3:
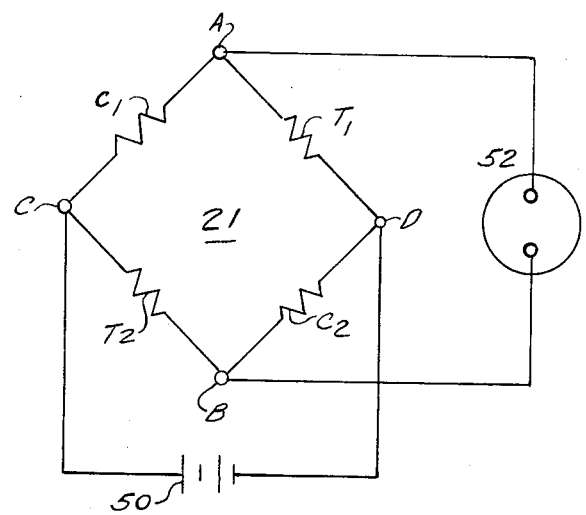
FIG. 3 shows the basic bridge circuit utilizing the strain gages for force measurement.
Figure 4:
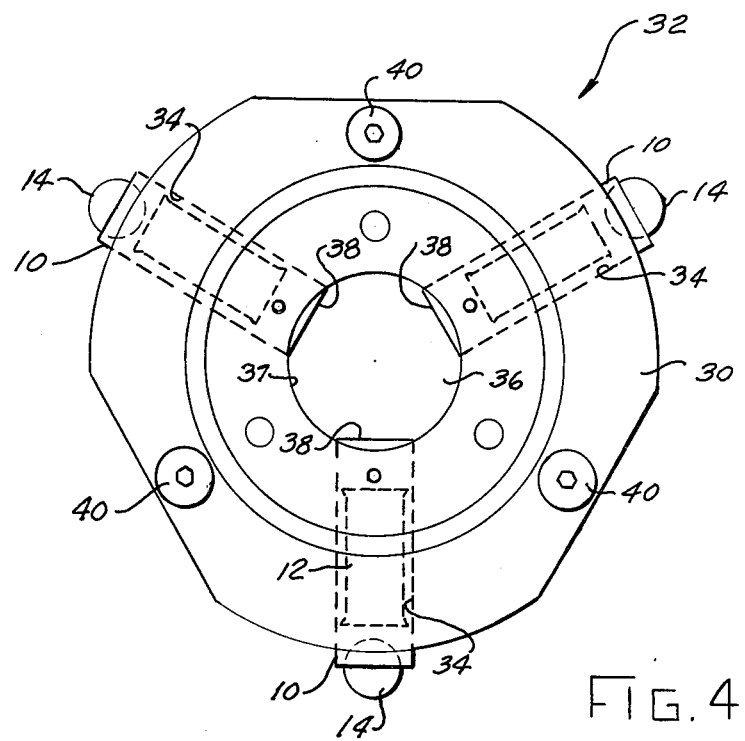
FIG. 4 is a rear view of a force measuring device according to the teaching of the present invention.
Figure 5:
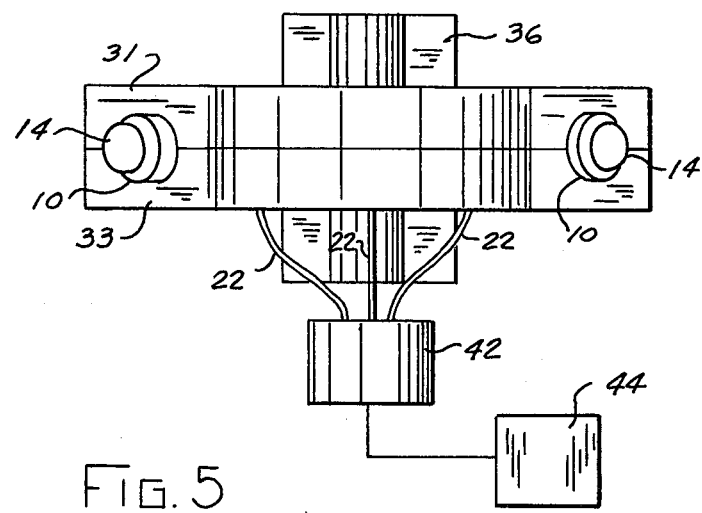
FIG. 5 is a top view of the force measuring device shown in FIG. 4.

Three force transducers 10 are utilized in a housing 30 as shown in FIGS. 3 through 5 to provide a three jaw chuck force measuring device 32. Force measuring device 32 comprises housing 30 having three angularly spaced radial bores 34 extending therethrough. An elongated force transducer 10 is disposed in each radial bore 34. An internal shaft 36 is provided extending through an opening 37 in housing 30. Flat equally spaced surfaces 38 are provided on shaft 36 for engaging the inner ends of transducers 10. Shaft 36 solidly supports transducers 10 against radially inward movement. Housing 30 is formed from two parts 31 and 33 which are connected together by fasteners 40. The halves 31 and 33 which form housing 30 can be easily opened up to facilitate replacement of a force transducer 10. Each transducer 10 has an opening 13 formed therein. Opening 13 is used for aligning and retaining transducer 10 in housing 30.

The electrical connections to each connector block 16 are brought out through a conventional slip ring arrangement 42 to a power supply and instrument enclosure 44. Enclosure 44 contains power supply 50 and meter 52.

Figure 6:
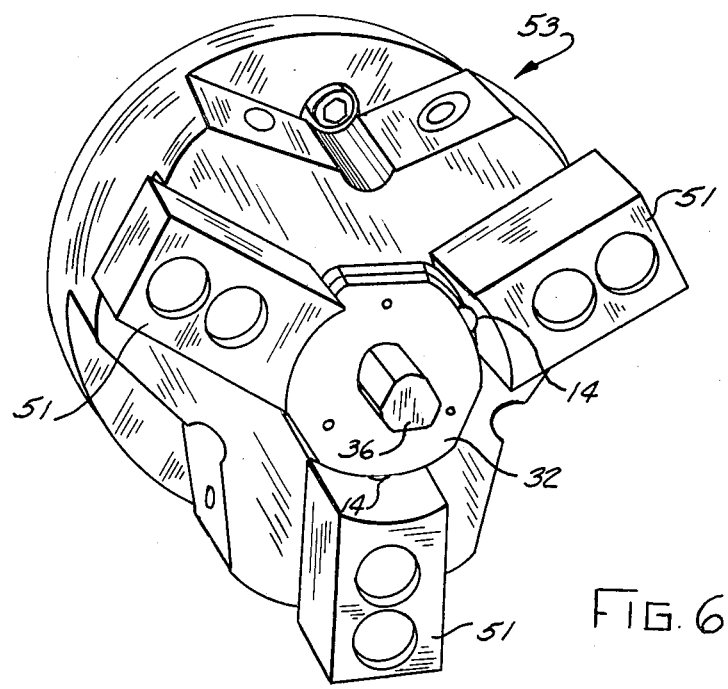
FIG. 6 shows the force measuring device shown in FIG. 4 clamped in a three jaw chuck; and, FIG. 7 shows a bridge connection utilizing strain gages on three transducers to measure average force on all transducers.

During use three jaw chuck force measuring device 32 is clamped by jaws 51, as shown in FIG. 6. The three chuck jaws 51 of a chuck 53 are closed onto force measuring device 32. Each jaw 51 contacts a transducer 10. The hardened spherical ball 14 bonded into the conical seat in transducer 10 provides point contact between transducer 10 and the jaws of the chuck. Each ball 14 will only transmit radial jaw forces. Further, the strain gages 18 and 20 are disposed to transmit only axial loads. The gage arrangement shown compensates for temperature, and bending and shear components are eliminated.

Referring now to FIG. 3 there is shown a known bridge circuit arrangement for interconnecting strain gages $C_1$, $C_2$, $T_1$, $T_2$ on a force transducer 10. A power supply 50 provides power to point C and D of the bridge. An instrument 52 connected across points A and B detects bridge unbalance. As force is applied to the strain gages their resistance changes and this can be detected by an unbalance of bridge circuit 21. The use of strain gages connected in a bridge configuration for measuring forces is well known in the art and is described in: Strain Gage Primer, by C. C. Perry and H. R. Lissner, 1955 McGraw Hill; and Mechanical Measurements by T. G. Beckwith and N. Lewis Buck, 1961 Addison-Wesley.

Figure 7:
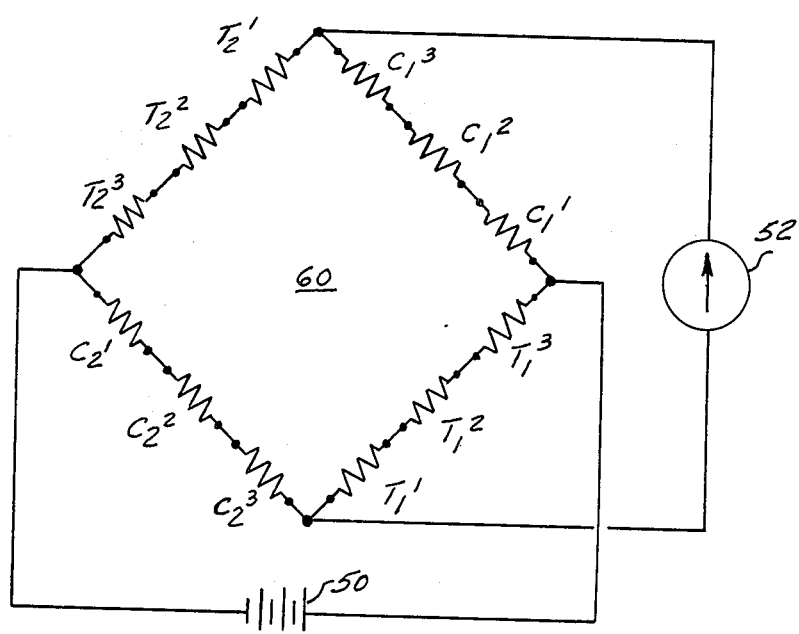

Referring now to FIG. 7, there is shown a bridge connection 60 utilizing the strain gages $C_1$, $C_2$, $T_1$, $T_2$ from three force transducers 10, to measure the average force of all transducers 10. Each leg of the bridge contains the corresponding transducer gages connected in series. Power supply 50 provides power to bridge 60 and meter 52 detects bridge unbalance.

I claim:

1. An electrical force measuring device for measuring the force exerted by a gripping device comprising:
   a plurality of elongated force transducers each of which comprises,
   an elongated member having a square cross section portion formed intermediate its ends,
   a four arm strain gage bridge with two of the gages mounted on one side of the square cross section portion of the elongated force transducer and the other two gages mounted on the opposite side of the square cross section portion,
   connecting means for connecting the bridge to suitable instrumentation which indicates the force applied to said elongaged member;
   an annular housing having radial passages formed therein with one of said elongated force transducers disposed in each passage; and,
   an inner support partially disposed within said housing for solidly supporting the inner end of each cylindrical steel member against radially inward movement.

2. An electrical force measuring device as claimed in claim 1 wherein each of said plurality of elongated force transducers comprises:
   a cylindrical steel member forming said elongated member;
   a steel ball disposed in the outer end of said cylindrical steel member to provide point contact with the engaging gripping device.

3. An electrical force measuring device as claimed in claim 1 wherein said connecting means comprises:
   slip rings permitting said housing to rotate relative to the instrumentation.

4. An electrical force measuring device as claimed in claim 1 wherein said annular housing comprises:
   two portions which are joined together along a radial plane.

5. An electrical force measuring device as claimed in claim 1 wherein said inner support comprises:
   a shaft having equally spaced axially extending flat surfaces each of which is engaged by an inner end of one of said elongated force transducers.

6. A force transducer for measuring the force exerted by a gripping device having gripping elements such as the jaws of a chuck or segment of a collet comprising:
   elongated shaped members each having at least two flat parallel surfaces formed intermediate its ends;
   four strain gages associated with each of said elongated shaped members with two of the strain gages disposed on one of the two flat parallel surfaces and the other two strain gages disposed on the opposite flat surface;
   a housing;
   aligning means for aligning the elongated shaped members to extend radially outward from the housing into engagement with the gripping elements;
   support means for engaging and solidly supporting the inner end of each elongated shaped member against radially inward movement;
   instrumentation for monitoring the four strain gages; and
   electric connecting means for connecting the four strain gages to said instrumentation.

7. A force transducer as claimed in claim 6 wherein:
   said elongated shaped members are cylindrical; and
   a sphere disposed in the outer end of each of said elongated cylindrical shaped members provides point contact with each gripping element.

8. A force transducer as claimed in claim 6 wherein said electric connecting means comprises:
   slip ring means disposed between said instrumentation and said four strain gages to permit relative movement.

9. A force transducer as claimed in claim 6 wherein:
   said four strain gages associated with each of said elongated shaped members are connected in bridge configurations.

10. A force transducer as claimed in claim 6 wherein:
   said four gages associated with each of said elongated shaped member are all connected in a bridge configuration with corresponding gages of each of said elongated shaped members connected in series in a leg of the bridge to measure average force on all elongated shaped members.

* * * * *